(12) United States Patent
Cuthbertson et al.

(10) Patent No.: US 9,433,188 B2
(45) Date of Patent: Sep. 6, 2016

(54) PET LOCK

(76) Inventors: James William Cuthbertson, Delta (CA); Shannon Alexandra Maclean, Delta (CA)

(*) Notice: Subject to any disclaimer, the term of this patent is extended or adjusted under 35 U.S.C. 154(b) by 0 days.

(21) Appl. No.: 13/253,486

(22) Filed: Oct. 5, 2011

(65) Prior Publication Data
US 2013/0087105 A1 Apr. 11, 2013

(51) Int. Cl.
B65H 75/34 (2006.01)
A01K 1/04 (2006.01)
A01K 27/00 (2006.01)

(52) U.S. Cl.
CPC ............... *A01K 1/04* (2013.01); *A01K 27/003* (2013.01); *A01K 27/005* (2013.01); *Y10T 70/5009* (2015.04)

(58) Field of Classification Search
USPC ............... 119/792–796, 784, 785; 70/30
See application file for complete search history.

(56) References Cited

U.S. PATENT DOCUMENTS

| 153,724 A * | 8/1874 | Schmidt ........................ 54/34 |
| 3,867,905 A | 2/1975 | Vail, Jr. |
| 3,910,081 A | 10/1975 | Pender |
| 4,398,500 A * | 8/1983 | Koronkiewicz ............. 119/793 |
| 4,543,806 A | 10/1985 | Papandrea et al. |
| 4,621,589 A | 11/1986 | Thinnes |
| 4,941,434 A | 7/1990 | Ellwanger |
| 5,003,929 A * | 4/1991 | Dean ........................... 119/784 |
| 5,174,246 A * | 12/1992 | Driver ......................... 119/795 |
| 5,462,019 A * | 10/1995 | Hong-Rong et al. ........ 119/795 |
| 5,497,732 A * | 3/1996 | Moffre et al. ................ 119/784 |
| 5,722,351 A | 3/1998 | Roper |
| 6,095,094 A * | 8/2000 | Phillips ........................ 119/792 |
| 6,205,956 B1 | 3/2001 | Dickie et al. |
| 6,371,056 B1 * | 4/2002 | Phillips ........................ 119/793 |
| 6,581,548 B1 * | 6/2003 | Reid ............................. 119/795 |
| 6,688,260 B2 * | 2/2004 | Morrison ..................... 119/796 |
| 7,040,257 B2 * | 5/2006 | Waxman et al. ............ 119/796 |
| 7,104,093 B2 * | 9/2006 | Ling et al. ....................... 70/30 |
| 7,819,088 B2 | 10/2010 | Stern |
| 7,886,700 B2 | 2/2011 | Glazer |
| 8,418,659 B2 * | 4/2013 | Harruna ....................... 119/796 |
| 2007/0157892 A1 * | 7/2007 | Farrell et al. ................ 119/795 |
| 2007/0158158 A1 | 7/2007 | Ameche |
| 2008/0042000 A1 * | 2/2008 | Horton ........................ 242/382 |
| 2008/0105214 A1 | 5/2008 | Moulton |
| 2010/0326371 A1 * | 12/2010 | Lopusnak et al. ........... 119/796 |
| 2011/0083617 A1 | 4/2011 | Townsend et al. |
| 2013/0174616 A1 * | 7/2013 | Allen, Jr. ......................... 70/30 |

FOREIGN PATENT DOCUMENTS

CA    1 171 294    7/1984

* cited by examiner

*Primary Examiner* — Kristen C Hayes
(74) *Attorney, Agent, or Firm* — Richard D. Okimaw

(57) ABSTRACT

A method and apparatus for securing a pet leash to an object. The apparatus comprises a body connectable to a leash secured to the pet and a flexible member extending from the body. The flexible member has sufficient length to be passed around an object and a free distal end. The body has a receiver operable to selectably and lockably receive the free distal end of the flexible member therein. The method comprises providing a body connectable to a leash secured to the pet, extending a flexible member from the body around an object and selectably and lockably securing a distal end of the flexible member into a receiver of the body. The body may comprise a handle body of a leash.

14 Claims, 5 Drawing Sheets

PET LOCK

BACKGROUND OF THE INVENTION

1. Field of Invention

The present invention relates to pet security in general and in particular to a method and apparatus for securing a pet against to a stationary object.

2. Description of Related Art

Pets are common companions for many people. In particular, dogs are a popular pet for many people. Dogs are frequently taken by their owners on walks. When in public, such as during a walk, pet leashes are typically used to restrain or control the pet. In many buildings and establishments, pets are not allowed, due to health, safety or other concerns. In such establishments, it is frequently necessary to tie up or otherwise restrain the pet outside of the establishment. Frequently, the leash of the pet is used for such purpose by tying the leash to a post or other stationary object.

One difficulty of tying up a pet to a stationary object is that the knot used to tie up the pet may become loose or untied thereby permitting the pet to become lost. Other difficulties are that the knot may be untied by another person other than the owner, thereby exposing the pet to being stolen. Previous attempts to secure a pet from being stolen or lost have not been satisfactory. In particular, some attempts have been made to provide a structure which permits the leash to be secured back to itself thereby forming a loop in the leash which may be positioned around a stationary object.

Such devices, however require adaptation to the end of the leash for use in extending around the stationary object such as opening or closing the loop which may interfere with the user's ability to hold the leash. Additionally, some users may find it less desirable that portion of the leash which they are to hold is to be wrapped around and in close contact with an external object which may be considered unhygienic. Examples of such devices may be found in U.S. Pat. No. 6,095,094 to Phillips and U.S. Pat. No. 5,462,019 to Hong-Rong et al and Canadian Patent No 1,171,294 to Koronkiewicz.

SUMMARY OF THE INVENTION

According to a first embodiment of the present invention there is disclosed an apparatus for securing a pet leash to an object. The apparatus comprises a body connectable to a leash secured to the pet and a flexible member extending from the body. The flexible member has sufficient length to be passed around an object and a free distal end. The body has a receiver operable to selectably and lockably receive the free distal end of the flexible member therein.

The body may comprise a leash handle. The leash may be retractable into the body. The body may be slidably connectable to a middle portion of the leash. The body may be secured to a middle portion of the leash.

The flexible member may comprise a cord. The cord may be braided. The cord may be formed of a material selected from the group consisting of steel, stainless steel and nylon. The flexible member may be retractable into the body. The flexible member may be biased to a retracted position within the body. The flexible member may have an extended length selected to be between 3 and 7 feet. The free distal end of the flexible member may include a locking member. The locking member may comprise a substantially cylindrical member.

The receiver may comprise a bore in the body. The receiver may include locking means for selectably locking the locking member within the receiver. The locking means may comprise a keyed lock. The locking means may comprise a combination lock.

According to a further embodiment of the present invention there is disclosed an apparatus for restraining a pet comprising a leash having a proximate end having a handle body and a distal end having a connector for securing to a collar of the pet and a flexible member extending from the handle body. The flexible member has sufficient length to be passed around an object and a free distal end. The apparatus further comprises a receiver in the handle body operable to selectably and lockably receive the free distal end of the flexible member. The leash may be retractable into the handle body.

According to a further embodiment of the present invention there is disclosed a method of securing a pet to an object. The method comprises providing a body connectable to a leash secured to the pet, extending a flexible member from the body around an object and selectably and lockably securing a distal end of the flexible member into a receiver of the body.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention wherein similar characters of reference denote corresponding parts in each view.

DETAILED DESCRIPTION

Figure 1:
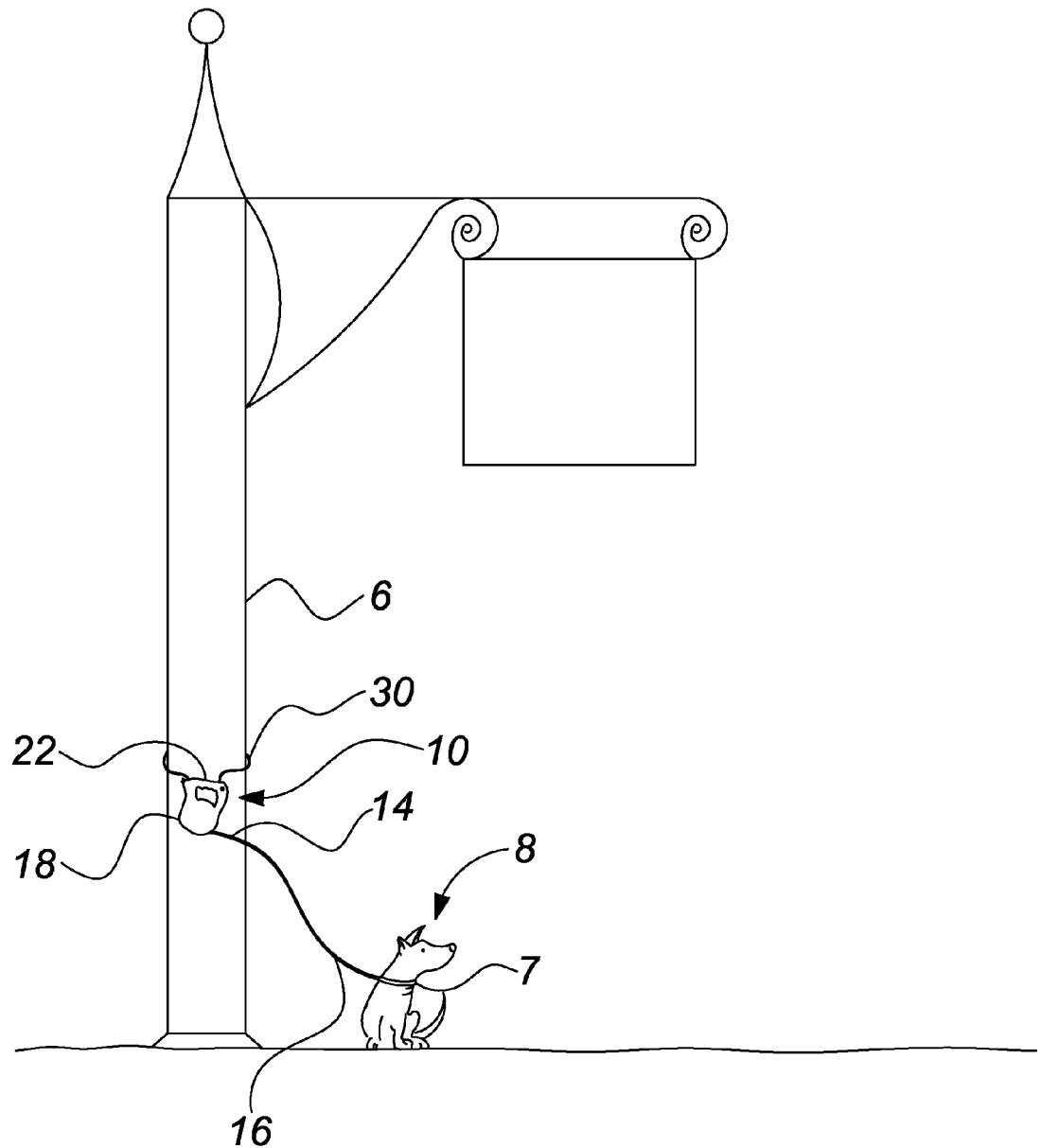
FIG. 1 is a perspective view of an apparatus according to a first embodiment of the present invention securing a dog to a post according to a first embodiment of the present invention.

Referring to FIG. 1, an apparatus according to a first embodiment of the invention is shown generally at 10 as securing a dog 8 to a post 6 or other object. The apparatus 10 comprises a leash 12 extending between proximate and distal ends, 14 and 16, respectively. The proximate end 14 includes a handle body 18 and the distal end includes a connector 19 for connecting to a pet collar 7 as are commonly known in the art. The handle body 18 includes a flexible member 30 extending therefrom for extending around and securing the handle body 18 the post 6 or other object.

Figure 2:
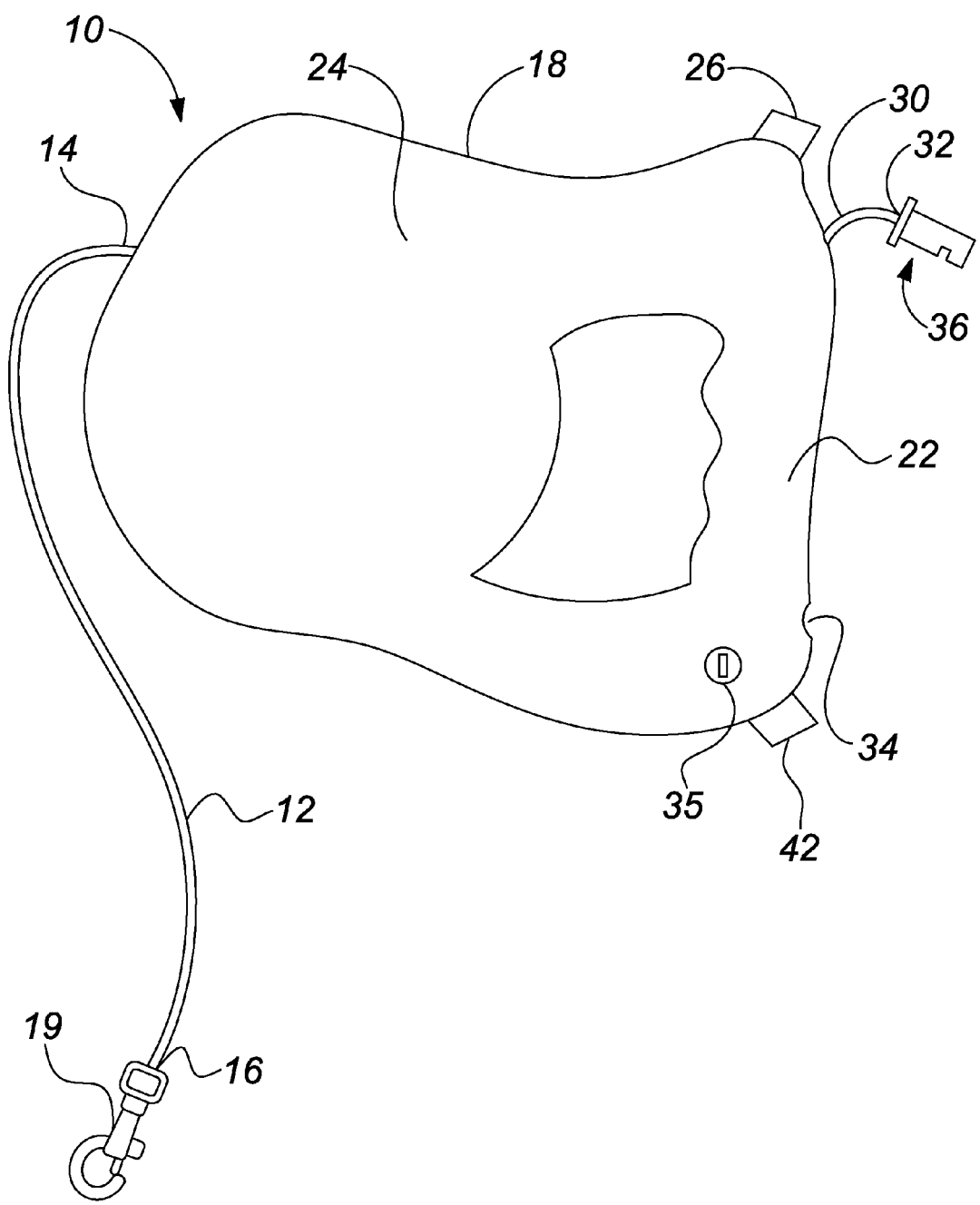
FIG. 2 is a plan view of the apparatus of FIG. 1.

Turning to FIG. 2, a detailed view of the apparatus 10 is shown. As illustrated, the handle body 18 may include a handle portion 22 and a casing portion 24. The handle portion 22 may optionally include a release button 26 for releasing the leash 12 to be extended from the handle body 20 as are commonly known in the art.

Figure 3:
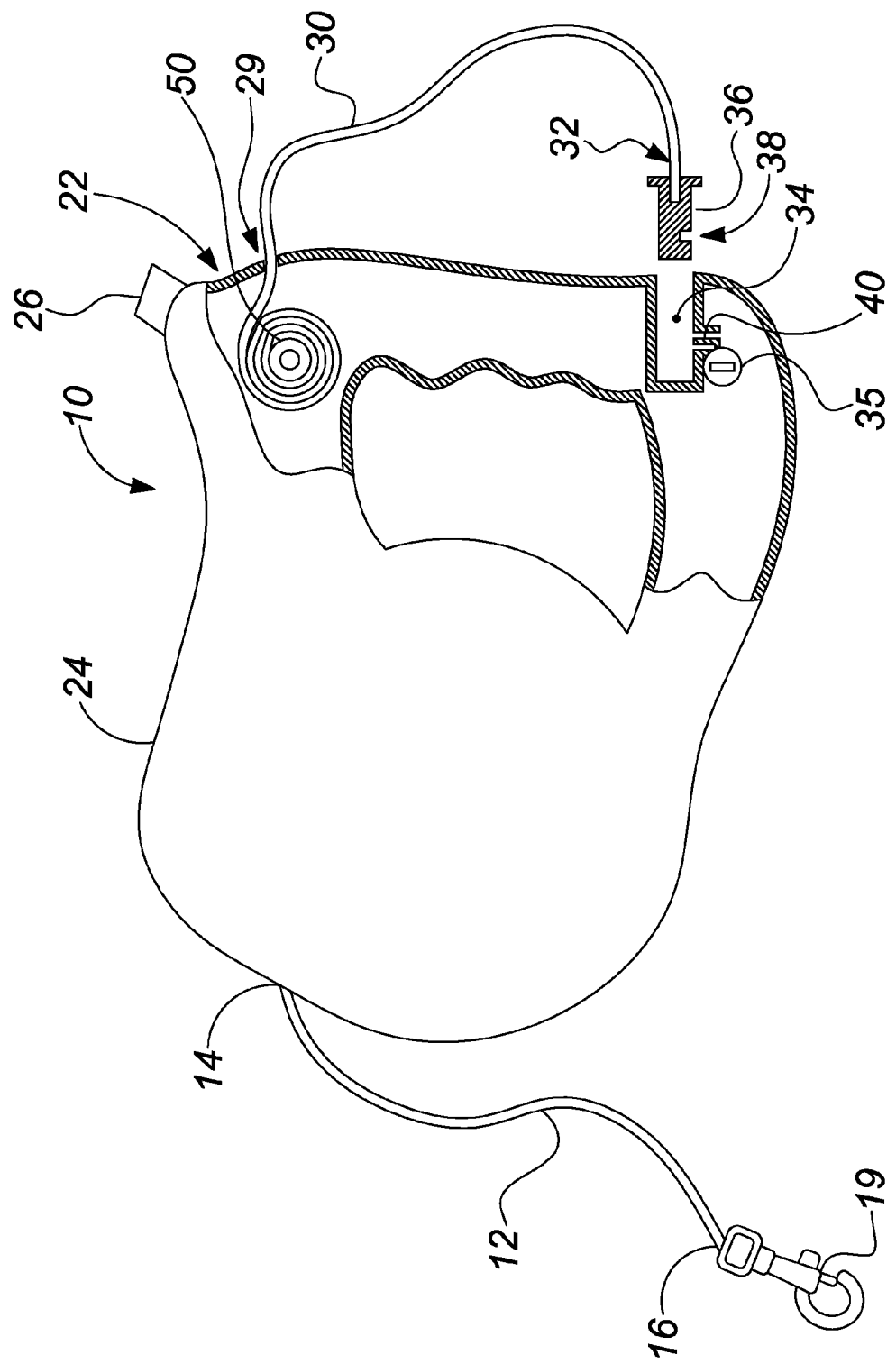
FIG. 3 is a partial cross sectional view of the apparatus of FIG. 1.

As illustrated in FIGS. 2 and 3, the flexible member extends from one side of the handle portion 22 and includes a distal end 32. The handle portion 22 also includes a receiving port 34 for receiving the distal end 32 of the flexible member therein and a lock 35 for securing the distal end 32 of the flexible member within the receiving port 34. The lock 35 is illustrated in FIGS. 2 and 3 as a key lock, although it will be appreciated that any other type of lock may also be utilized, such as, by way of non-limiting example, a combination lock, a catch or an electronically actuated lock. As illustrated in FIG. 3, the distal end 32 includes a plug 36 comprises an elongate portion having a shape corresponding substantially to the receiving port 34. According to one embodiment, the receiving port 34 may include an extendable pin 40 or other similar latch therein adapted to engage a notch 38 or other portion of the plug so as to retain it within the receiving port 34. It will be appreciated that although one possible option for locking the plug 36 within the receiving port is illustrated, any other type of locking mechanism may also be utilized. Optionally, a release button 42 may be provided wherein the plug 36 is retained within the receiving port 34 until the release button 42 is pressed by a user. The release button 42 may be provided with any type of lock mechanism wherein the lock mechanism locks the plug within the port and the release button ejects the plug therefrom. It will also be appreciated that the release button 42 may be utilized without a lock mechanism for applications where it is not necessary to lock the pet to the stationary object, but rather just to prevent them from running away.

The flexible member 30 comprises an elongate flexible tensile member having sufficient strength so as to not be easily cut or broken. The flexible member 30 may be formed of a material which is substantially non-elastic. According to some embodiments, the flexible member may be formed of steel, stainless steel or nylon and may optionally be a braided steel cable or rope. It will be appreciated that the material and size of the flexible member should be selected to permit it to be bent and threaded through openings so as to permit being wrapped around objects as will be further described below. The flexible member 30 should also be selected to have a length sufficient to permit it to be passed around a variety of objects so as to permit the apparatus to be secured at a plurality of locations. By way of non-limiting example, the flexible member may have a length of between 3 and 7 feet (914 and 2134 mm) although it will be appreciated that other lengths may be useful as well.

Optionally, the apparatus 10 may include a retracting mechanism 50 secured to the end of the flexible member 30 so as to retract the flexible member into the casing of the apparatus when not in use as are commonly known. As illustrated in FIG. 3, according to one embodiment of the present invention, the retracting may comprise a spool around which the flexible member is wound when not in use within the handle body 18. It will be appreciated that the spool may be continuously or intermittently biased to retract the flexible member either when desired by user or on a continuous basis. The spool may also be co-axial with or separate from a similar spool for retracting the leash 12 into the handle body 18. As illustrated, the flexible member 30 may past through a bore 29 in the handle body 18.

Figure 4:
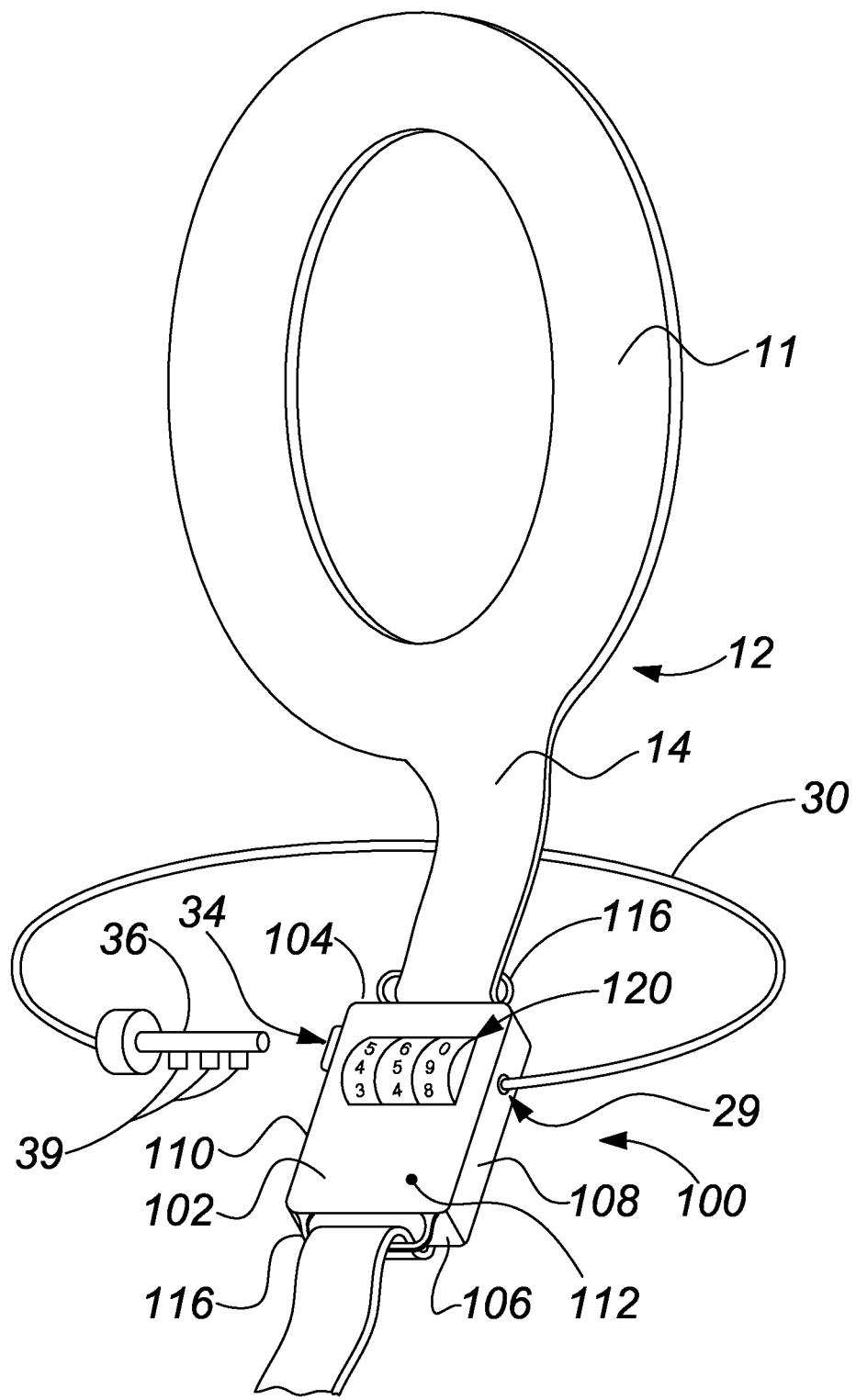
FIG. 4 is a perspective view of an apparatus for securing a pet leash to an object according to a further embodiment of the present invention.
Figure 5:
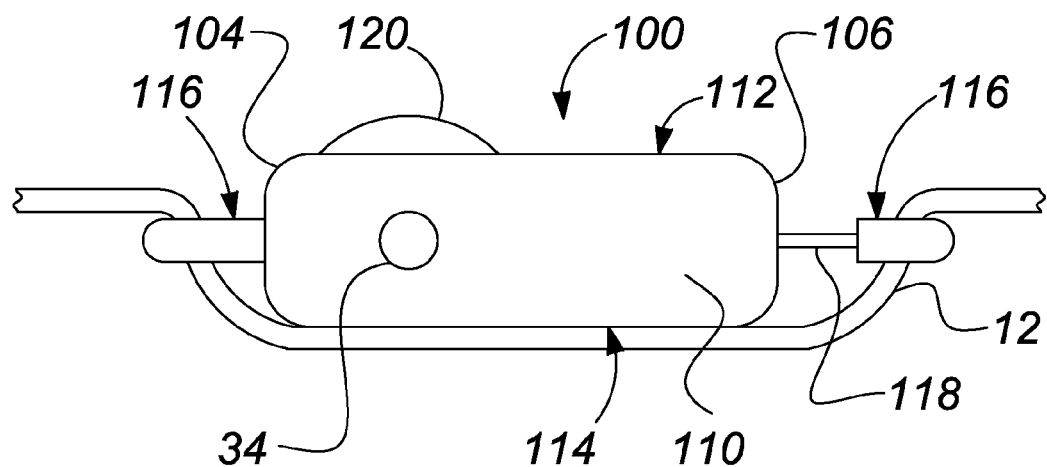
FIG. 5 is a side view of the apparatus of FIG. 4.
Figure 6:
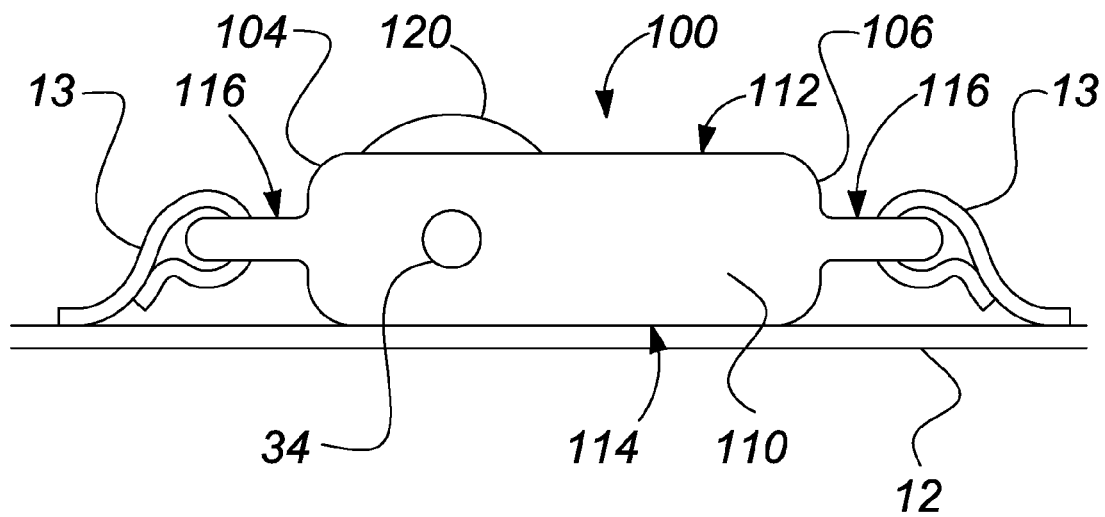
FIG. 6 is a side view of the apparatus of FIG. 4 according to a further embodiment of the present invention having a stationary position on the pet leash

Turning now to FIG. 4, an alternative embodiment of the present invention is illustrated at 100, for use with a non-retractable leach or other object. By way of non-limiting example, the leash 12 may not include a handle 11 or other loop in a proximate end 14 thereof. The apparatus 100 comprises a body 102 connectable to leash having first and second ends, 104 and 106, respectively, first and second sides, 108 and 110, respectively and front and back surfaces, 112 and 114, respectively. Each of the first and second ends 104 and 106 includes a loop 116 extending therefrom for passing the a portion of the leash 12 therethrough. As illustrated in FIG. 5, the loops 116 may permit a portion of the leash 12 to slidably pass therethrough or may optionally be engaged by tie-down loops 13 connected to the leash as illustrated in FIG. 6 by means of stitching, adhesives or the like. Optionally, the loops 116 may be biased towards the body 102 by a biasing element 118 as illustrated in FIG. 5 to permit the loops 116 to be spaced apart from the body 102 and thereby to permit the end connector 19 of the leash to be passed therethrough.

The flexible member 30 extends from the bore 29 in the first side 108 and is sized to extend around a stationary object as will be described further below. As set out above the flexible member 30 includes an end plug 36 which is adapted to be lockably received within a receiving port 34 in the second side 110 of the body 102. The apparatus 100 also includes a locking means, such as by way of non-limiting example a combination lock 120 on the front surface 112 thereof. By way of non-limiting example, the end plug 36 may comprise a substantially cylindrical member having a plurality of projections 39 extending radially therefrom for engagement by the lock 120. It will also be appreciated that the body 102 may include a retracting mechanism 50 as set out above for retracting the flexible member 30 into the body 102 when not in use.

In operation, when a user wishes to secure the leash to an object, they may pull out or otherwise extend the flexible member from the body 102 or handle body 18. Thereafter the flexible member may be wrapped around the object and the plug 36 secured within the receiving port 34 to lock the body 102 or handle body 18 and leash 12 to the object permitting the user to leave their pet at that location in a secure fashion. When the user returns and wishes to resume walking, they may utilize their key, combination or other releasing device on the lock 35 or 120 to release the plug 36 therefrom. Thereafter, the retracting mechanism 50 may retract the excess length of the flexible member to keep it out of the way for the user.

It will be appreciated that the present invention provides a secure and convenient method for securing a pet to an apparatus. In particular, the present apparatus provides a more secure means of securing a pet than tying the leash around an object due to the additional security of the lock. It will also be appreciated that the present apparatus is quicker and more convenient to release the pet from the object by providing a securing mechanism which may be operated by a single hand thereby permitting a user to release their pet without putting down a bag of groceries or other object that they may be carrying in the other hand. Additionally, the present apparatus assists in keeping the user's leash cleaner by not requiring the leash to be tied around an external object which may therefore make the leash dirty.

While specific embodiments of the invention have been described and illustrated, such embodiments should be considered illustrative of the invention only and not as limiting the invention as construed in accordance with the accompanying claims.

What is claimed is:

1. An apparatus for securing a pet to an object, the apparatus comprising:
   a handle body;
   a pet leash retractably extending from said handle body;

a flexible member retractably extending from said body, said flexible member being independent of said pet leash and having sufficient length to be passed around an object and a free distal end; and a receiver in said handle body operable to receive said free distal end of said flexible member wherein said receiver includes a securing means for selectably securing said distal end of said flexible member within said receiver.

2. The apparatus of claim 1 wherein said handle body comprises a leash handle.

3. The apparatus of claim 1 wherein said flexible member comprises a cord.

4. The apparatus of claim 3 wherein said cord is braided.

5. The apparatus of claim 3 wherein said cord is formed of a material selected from the group consisting of steel, stainless steel and nylon.

6. The apparatus of claim 3 wherein said flexible member is biased to a retracted position within said body.

7. The apparatus of claim 3 wherein said flexible member has an extended length selected to be between 3 and 7 feet.

8. The apparatus of claim 1 wherein said free distal end of said flexible member includes a locking member.

9. The apparatus of claim 8 wherein said locking member comprises a substantially cylindrical member.

10. The apparatus of claim 9 wherein said receiver comprises a bore in said body.

11. The apparatus of claim 10 wherein said receiver includes locking means for selectably locking said locking member within said receiver.

12. The apparatus of claim 11 wherein said locking means comprises a keyed lock.

13. The apparatus of claim 11 wherein said locking means comprises a combination lock.

14. A method of securing a pet to an object, the method comprising:

providing a handle body having a leash retractably extending therefrom;

extending a flexible member from said handle body independently of said leash around an object; and selectably and lockably securing a distal end of said flexible member into a port of said handle body.

* * * * *